United States Patent
Gaite

(10) Patent No.: US 6,293,487 B1
(45) Date of Patent: Sep. 25, 2001

(54) JUMBO JET AIRCRAFT FOR MID-FLIGHT RESCUING OF ANOTHER AIRCRAFT IN DISTRESS

(76) Inventor: Elsa Gaite, 107-49 126th St., Richmond Hill, NY (US) 11419

( * ) Notice: Subject to any disclaimer, the term of this patent is extended or adjusted under 35 U.S.C. 154(b) by 0 days.

(21) Appl. No.: 09/478,663

(22) Filed: Jan. 6, 2000

(51) Int. Cl.$^7$ .................................................. B64D 3/00
(52) U.S. Cl. ............................................................ 244/3
(58) Field of Search .................................. 244/1 TD, 2, 3

(56) References Cited

U.S. PATENT DOCUMENTS 5,000,398 * 3/1991 Rashev ...................................... 244/2

* cited by examiner

Primary Examiner—Charles T. Jordan
Assistant Examiner—George L. Steele

(57) ABSTRACT

An improved jumbo jet aircraft for mid-flight rescuing of another aircraft in distress. The improvement includes a pair of struts that extend upwardly from the fuselage and piggyback the another aircraft to safety, two pair of hooks that are disposed on the wings, a fog light that is disposed on the fuselage and aids viewing the another aircraft during a fog, four pair of fire extinguishers that are disposed in the wings and extinguish any fires on the another aircraft, four emergency doors that are disposed throughout the fuselage and emergency receive any passengers of the another aircraft, a pair of platforms that extend from the fuselage and fluidly communicate with in close proximity to, but not touching, a wing tip of the another aircraft and provide, by virtue of their circulation and wash, forces necessary to stabilize the another aircraft, a pair of toll cables that extend rearwardly from the wings and tow the another aircraft to safety, a fuel hose that depends from the fuselage and refuels the another plane in flight, two pair of second fire extinguishers that are disposed in the fuselage and extinguish any fires on the another aircraft.

31 Claims, 1 Drawing Sheet

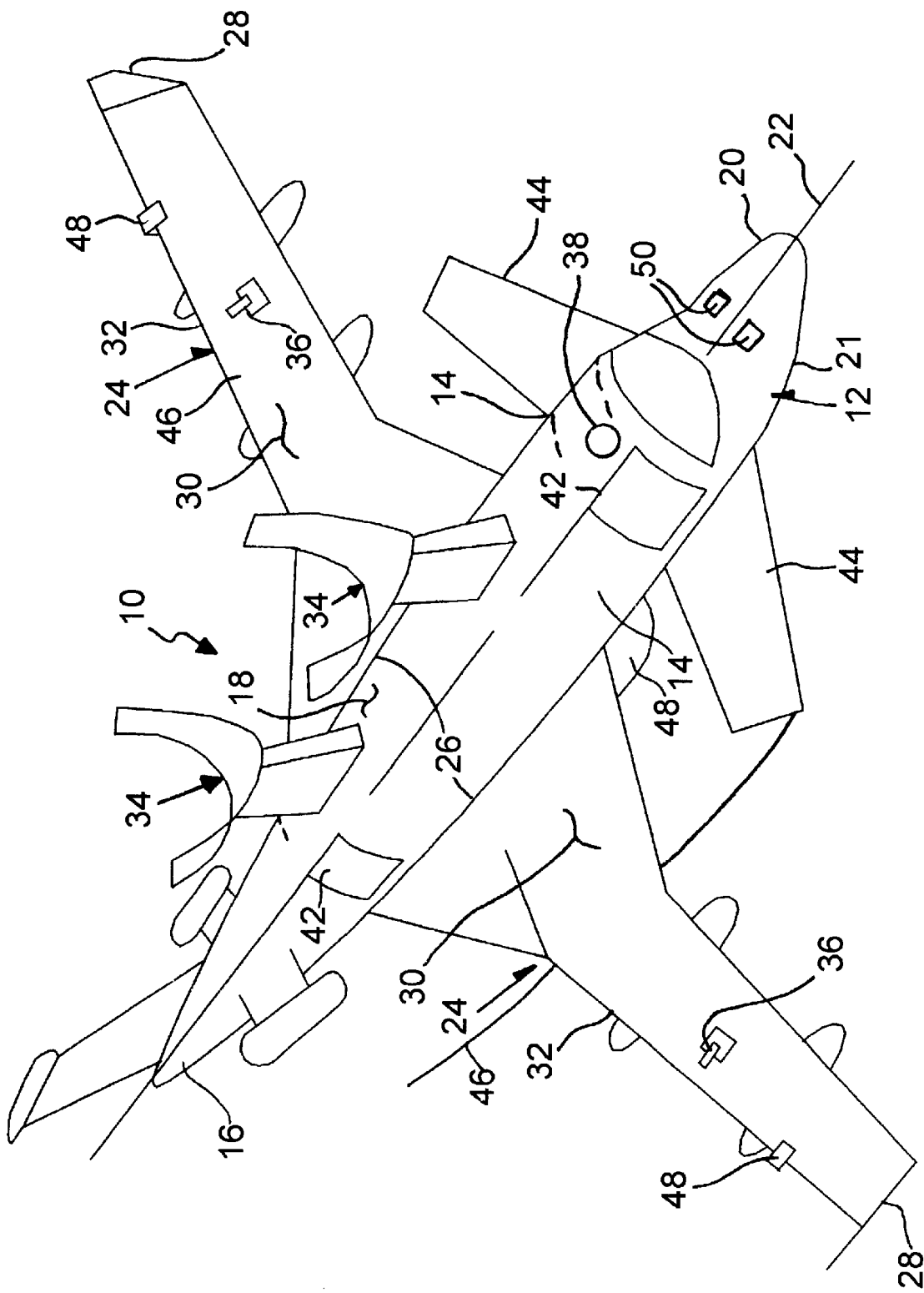

JUMBO JET AIRCRAFT FOR MID-FLIGHT RESCUING OF ANOTHER AIRCRAFT IN DISTRESS

BACKGROUND OF THE INVENTION

1. Field of the Invention

The present invention relates to a jet aircraft. More particularly, the present invention relates to an improved jumbo jet aircraft for mid-flight rescuing of another aircraft in distress.

2. Description of the Prior Art

One main cause of mid-flight disasters is the malfunction of the engines.

Aircraft engines are typically attached to the wing of an aircraft by means of nacelle struts or pylons which enclose the pneumatic, electric, fuel, and hydraulic connections to the engine as well as links and spars supporting the engine from the airplane wing. Struts are essentially frame and skin structures riveted and bonded together to form a torque box.

The aircraft engine operates at high temperatures whereby a strut fire seal and fire wall are desirably incorporated to protect the wing and upper strut systems from exposure to high temperatures and fire wall damage. Fire wall continuity is desirably maintained with the stainless steel primary exhaust nozzle sleeve of the engine serving as a continuation of a strut fire wall.

An engine fire must be contained and must not penetrate the adjacent strut structure. The unusual contour of the exhaust nozzle, however, can produce a gap that is uneven in dimension between the nozzle upper forward edge surface and the strut structure lower surface.

The engine is, of course, very heavy and is subject to relative motion with respect to the airplane structure due to thermal and loading conditions.

Numerous innovations for aircraft safety devices have been provided in the prior art that will be described. Even though these innovations may be suitable for the specific individual purposes to which they address, however, they differ from the present invention in that they do not teach an improved jumbo jet aircraft for mid-flight rescuing of another aircraft in distress.

FOR EXAMPLE, U.S. Pat. No. 4,106,729 to Bergman et al. teaches an escape slide container that is mounted for selective, upward movement with a track-mounted, overhead sliding door in an aircraft fuselage. Slide deployment mechanism for releasing the container from the door and for attaching it to the floor of the aircraft allows the door to move upwardly independently of the container, leaving the container attached to the floor. An over-center linkage supports the container above the floor while upward movement of the door trips the over-center linkage to propel the container outwardly through the door opening to deploy the escape slide under the urging of gravity.

ANOTHER EXAMPLE, U.S. Pat. No. 4,285,403 to Poland teaches a waterproofed explosive charge that is suspended within a frangible, spherical shell containing an aqueous solution. The assembly is dropped from an airplane or helicopter towards a fire below. Either a shock-actuated percussion cap or a fuse-ignited detonation cap activates the explosive charge at the appropriate moment and the resultant explosion creates a vapor-like fog. A portion of the combustion-supporting oxygen is displaced by the fog droplets. The minute water droplets also absorb heat energy, thereby lowering surrounding air and fuel temperatures. These effects, coupled with the concussive shock wave, act to snuff the fire.

STILL ANOTHER EXAMPLE, U.S. Pat. No. 5,400,985 to Banks teaches an emergency escape slide for a commercial passenger airplane that includes a girt bar which connects the slide to the airplane. The girt bar includes a middle portion having a rectangular cross section to which the slide is connected, and cylindrical end fittings which are attached to opposite ends of the middle portion. When the escape slide is armed, the cylindrical end fittings are positioned within floor mounted receptacles which permit the end fittings to rotate. Thus, when the escape slide is deployed, the girt bar is permitted to rotate so that the wide axis of the girt bar remains aligned with the loads generated by the slide deployment. In this manner, the strongest portion of the girt bar is in position to react the loads.

YET ANOTHER EXAMPLE, U.S. Pat. No. 5,524,846 to Shine et al. teaches a system for protecting the strut and wing structure of an airplane from high temperatures proximate the exhaust nozzle end of a jet engine that employs a set of outer spring metal fingers attached to the exhaust nozzle outer sleeve and which bear against the strut structure, and a second set of inner spring metal fingers, interleaved with the first, which close off interfinger slots in the first or outer set whereby to maintain firewall integrity. Hot gases are thereby prevented from passing forwardly into the strut structure and wing area so as to protect the same in the event of an engine fire.

It is apparent that numerous innovations for aircraft safety devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an improved jumbo jet aircraft for mid-flight rescuing of another aircraft in distress that avoids the disadvantages of the prior art.

BRIEFLY STATED, ANOTHER OBJECT of the present invention is to provide an improved jumbo jet aircraft for mid-flight rescuing of another aircraft in distress. The improvement includes a pair of struts that extend upwardly from the fuselage and piggyback the another aircraft to safety, two pair of hooks that are disposed on the wings, a fog light that is disposed on the fuselage and aids viewing the another aircraft during a fog, four pair of fire extinguishers that are disposed in the wings and extinguish aids fires on the another aircraft, four emergency doors that are disposed throughout the fuselage and emergency receive any passengers of the another aircraft, a pair of platforms that extend from the fuselage and fluidly communicate with in close proximity to, but not touching, a wing tip of the another aircraft and provide, by virtue of their circulation and wash, forces necessary to stabilize the another aircraft, a pair of toll cables that extend rearwardly from the wings and tow the another aircraft to safety, a fuel hose that depends from the fuselage and refuels the another plane in flight, two pair of second fire extinguishers that are disposed in the fuselage and extinguish any fires on the another aircraft.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The sole FIGURE of the drawing is a diagrammatic perspective view of the present invention.

LIST OF REFERENCE NUMERALS UTILIZED IN THE DRAWING 10 improved jumbo jet aircraft of the present invention for mid-flight rescuing of another aircraft in distress
12 fuselage of improved jumbo jet aircraft 10
14 side most surfaces of fuselage 12 of improved jumbo jet aircraft 10
16 tail of fuselage 12 of improved jumbo jet aircraft 10
18 uppermost surface of fuselage 12 of improved jumbo jet aircraft 10
20 nose of fuselage 12 of improved jumbo jet aircraft 10
21 lowermost surface of fuselage 12 of improved jumbo jet aircraft 10
22 axis of fuselage 12 of improved jumbo jet aircraft 10
24 wings of improved jumbo jet aircraft 10
26 roots of wings 24 of improved jumbo jet aircraft 10
28 tips of wings 24 of improved jumbo jet aircraft 10
30 uppermost surfaces of wings 24 of improved jumbo jet aircraft 10
32 trailing edges of wings 24 of improved jumbo jet aircraft 10
34 pair of struts for piggy backing another aircraft to safety
36 two pair of hooks
38 fog light for viewing another aircraft during a fog
40 four pair of first fire extinguishers for extinguishing any fires on another aircraft
42 four emergency doors for emergency reception of any passengers of another aircraft
44 pair of platforms
44 tip of pair of platforms 44 for fluidly communicating with in close proximity to, but not touching, wing tip of another aircraft and provide, by virtue of circulation and wash, forces necessary to stabilize another aircraft
46 pair of toll cables for towing another aircraft to safety
48 fuel hose for refueling another plane in flight
50 two pair of second fire extinguishers for extinguishing any fires on another aircraft

DETAILED DESCRIPTION OF THE PREFERRED EMBODIMENT

Referring now to the sole FIGURE, which is a diagrammatic perspective view of the present invention, the improved jumbo jet aircraft of the present invention is shown generally at 10 for mid-flight rescuing of another aircraft in distress.

The improved jumbo jet aircraft 10 is of a type having a fuselage 12 with side most surfaces 14, a tail 16, an uppermost surface 18, a nose 20, a lowermost surface 21, and an axis 22, and further having wings 24 with roots 26, tips 28, uppermost surfaces 30, and trailing edges 32.

The improvement comprises a pair of struts 34 that extend upwardly from the fuselage 12 for piggy backing the another aircraft to safety.

The pair of struts 34 are spaced-apart from each other, extend upwardly from the uppermost surface 18 of the fuselage 12, along the axis 22 of the fuselage 12, and are substantially Y-shaped for cradling the another aircraft.

The improvement further comprises two pair of hooks 36 that are disposed on the wings 24.

The two pair of hooks 36 are disposed on the uppermost surfaces 30 of the wings 24, between the roots 26 of the wings 24 and the tips 28 of the wings 24, with one hook 36 being disposed on each wing 24.

The improvement further comprises a fog light 38 that is disposed on the fuselage 12 for viewing the another aircraft during a fog.

The fog light 38 is disposed on the uppermost surface 18 of the fuselage 12, just behind the nose 20 of the fuselage 12, and is retractable to reduce drag when not in use.

The improvement further comprises four pair of first fire extinguishers 40 that are disposed in the wings 24 for extinguishing any fires on the another aircraft.

The four pair of first fire extinguishers 40 are disposed in the wings 24, and extending rearwardly from the trailing edges 32 of the wings 24, with two pair of first fire extinguishers 40 being disposed in each wing 24.

The improvement further comprises four emergency doors 42 that are disposed throughout the fuselage 12 for emergency reception of any passengers of the another aircraft.

A pair of emergency doors 42 are disposed on each side of the fuselage 12, between the nose 20 of the fuselage 12 and the tail 16 of the fuselage 12.

The improvement further comprises a pair of platforms 44 that extend from the fuselage 12 and have tips 45 for fluidly communicating with in close proximity to, but not touching, a wing tip of the another aircraft and provide, by virtue of their circulation, wash, and vortices, forces necessary to stabilize the another aircraft.

In explanation, (See AERODYNAMICS FOR ENGINEERING STUDENTS; Houghton and Brock; Edward Arnold; 1966), the pressure on the upper surfaces of the platforms 44 is lower than that of the surrounding atmosphere, while the pressure on the lower surfaces of the platforms 44 is greater than that on the upper surface of the platforms 44, and may be greater that of the surrounding atmosphere.

Thus, over the upper surfaces of the platforms 44, air will tend to flow inward towards the roots of the platforms 44 from the tips of the platforms 44, being replaced by air which was originally outboard of the tips of the platforms 44. Similarly, the undersurface air will either tend to flow inward to a lesser extent, or may tend to flow outward.

Where these to streams combine at the trailing edges of the platforms 44, the difference in span-wise velocity on the platforms 44 will cause the air to roll up into a number of small stream-wise vortices, distributed along the whole span of the platforms 44. These small vortices roll up into two large vortices at the tips of the platforms 44.

Thus:

$$K_0 2s' = \frac{\text{lift}}{\rho V}$$

Wherein:

$K_0 2s'$=area under the platforms 44

Hence:

$$\frac{s'}{s} = \frac{L}{2s\rho V K_0}$$

Wherein:
L=total lift on the platforms 44
And:

$$L = \rho V^2 s^2 2\pi A_1$$

And:

2s' is the distance apart of the vortex core centers at the tips of the platforms 44
And:
$K_0$ is the circulation on the platforms 44
And substituting also:

$$K_0 = 4sV \sum A_n \sin n\frac{\pi}{2}$$

And:

$$\frac{s'}{s} = \frac{\rho V^2 s^2 2\pi A_1}{2\rho V^2 \cdot 4s^2 \sum A_n \sin n\frac{\pi}{2}}$$

And:

$$\frac{s'}{s} = \frac{\pi}{4} \frac{A_1}{[A_1 - A_3 + A_5 - A_7]} \cdots$$

Then:

$$\frac{s}{s'} = \frac{4}{\pi}\left[1 - \frac{A_3}{A_1} + \frac{A_5}{A_1} - \frac{A_7}{A_1} \cdots \right]$$

And wherein:

$$A_3 = A_5 = A_7 = 0$$

Then:

$$s' = \frac{\pi}{4} s$$

The pair of platforms 44 extend outwardly from the side most surfaces 14 of the fuselage 12, between the nose 20 of the fuselage 12 and the wings 24, with a platform 44 extending outwardly from each side most surface 14 of the fuselage 12, and with the pair of platforms 44 being retractable to reduce drag when not in uEe.

The improvement further comprises a pair of toll cables 46 that extend rearwardly from the wings 24 for towing the another aircraft to safety.

The toll cables 46 extend rearwardly from the trailing edges 32 of the wings 24, between the roots 26 of the wings 24 and the tips 28 of the wings 24, with a toll cable 46 extending rearwardly from each wing 24, and with the pair of toll cables 46 being retractable to eliminate snagging when not in use.

The improvement further comprises a fuel hose 48 that depends from the fuselage 12 for refueling the another plane in flight.

The fuel hose 48 depends from the lowermost surface 21 of the fuselage 12, between the wings 24, and is retractable to eliminate snagging when not in use.

The improvement further comprises two pair of second fire extinguishers 50 that are disposed in the fuselage 12 for extinguishing any fires on the another aircraft.

The two pair of second fire extinguishers 50 are disposed in the fuselage 12, and extend upwardly from the nose 20 of the fuselage 12.

It will be understood that each of the elements described above, or two or more together, may also find a useful application in other types of constructions differing from the types described above.

While the invention has been illustrated and described as embodied in an improved jumbo jet aircraft for mid-flight rescuing of another aircraft in distress, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved jumbo jet aircraft for mid-flight rescuing of another aircraft in distress, of a type having a fuselage with side most surfaces, a lowermost surface, a tail, an uppermost surface, a nose, and an axis, and further having wings with roots, tips, uppermost surfaces, and trailing edges, said improvement comprising a pair of struts extending upwardly from the fuselage for piggybacking the another aircraft to safety; and
    wherein said improvement further comprises two pair of hooks that are disposed on the wings.

2. The improved aircraft as defined in claim 1, wherein said improvement further comprises said pair of struts being spaced-apart from each other and extending upwardly from the uppermost surface of the fuselage, along the axis of the fuselage.

3. The improved aircraft as defined in claim 1, wherein said improvement further comprises said pair of struts being substantially Y-shaped for cradling the another aircraft.

4. The improved aircraft as defined in claim 1, wherein said improvement further comprises one hook being disposed on each wing.

5. The improved aircraft as defined in claim 1, wherein said improvement further comprises said two pair of hooks being disposed on the uppermost surfaces of the wings.

6. The improved aircraft as defined in claim 1, wherein said improvement further comprises said two pair of hooks being disposed on the uppermost surfaces of the wings, between the roots of the wings and the tips of the wings.

7. The improved aircraft as defined in claim 1, wherein said improvement further comprises a fog light that is disposed on the uppermost surface of the fuselage for viewing the another aircraft during a fog.

8. The improved aircraft as defined in claim 7, wherein said improvement further comprises said fog light being disposed on the uppermost surface of the fuselage, just behind the nose of the fuselage.

9. The improved aircraft as defined in claim 7, wherein said improvement further comprises said fog light being retractable to reduce drag when not in use.

10. The improved aircraft as defined in claim 1, wherein said improvement further comprises four pair of first fire extinguishers that are disposed in the wings for extinguishing any fires on the another aircraft.

11. The improved aircraft as defined in claim 10, wherein said improvement further comprises two pair of first fire extinguishers being disposed in each wing.

12. The improved aircraft as defined in claim 10, wherein said improvement further comprises said four pair of first fire extinguishers being disposed in the wings, and extending rearwardly from the trailing edges of the wings.

13. The improved aircraft as defined in claim 1, wherein said improvement further comprises four emergency doors disposed throughout the fuselage for emergency reception of any passengers of the another aircraft.

14. The improved aircraft as defined in claim 13, wherein said improvement further comprises a pair of emergency doors being disposed on each side of the fuselage.

15. The improved aircraft as defined in claim 13, wherein said improvement further comprises a pair of emergency doors being disposed on each side of the fuselage, between the nose of the fuselage and the tail of the fuselage.

16. The improved aircraft as defined in claim 1, wherein said improvement further comprises a pair of platforms that extend from the fuselage and have tips for fluidly communicating with in close proximity to, but not touching, a wing tip of the another aircraft and provide, by virtue of their circulation, wash, and vortices, forces necessary to stabilize the another aircraft.

17. The improved aircraft as defined in claim 16, wherein said improvement further comprises said pair of platforms extending outwardly from the sidemost surfaces of the fuselage.

18. The improved aircraft as defined in claim 16, wherein said improvement further comprises said pair of platforms extending outwardly from the sidemost surfaces of the fuselage, between the nose of the fuselage and the wings.

19. The improved aircraft as defined in claim 16, wherein said improvement further comprises a platform extending outwardly from each sidemost surface of the fuselage.

20. The improved aircraft as defined in claim 16, wherein said improvement further comprises said pair of platforms being retractable to reduce drag when not in use.

21. The improved aircraft as defined in claim 1, wherein said improvement further comprises a pair of toll cables that extend rearwardly from the wings for towing the another aircraft to safety.

22. The improved aircraft as defined in claim 21, wherein said improvement further comprises said pair of toll cables extending rearwardly from the trailing edges of the wings.

23. The improved aircraft as defined in claim 21, wherein said improvement further comprises said pair of toll cables extending rearwardly from the trailing edges of the wings, between the roots of the wings and the tips of the wings.

24. The improved aircraft as defined in claim 21, wherein said improvement further comprises a toll cable extending rearwardly from each wing.

25. The improved aircraft as defined in claim 21, wherein said improvement further comprises said pair of toll cables being retractable to eliminate snagging when not in use.

26. The improved aircraft as defined in claim 1, wherein said improvement further comprises a fuel hose depending from the fuselage for refueling the another plane in flight.

27. The improved aircraft as defined in claim 26, wherein said improvement further comprises said fuel hose depending from the lowermost surface of the fuselage.

28. The improved aircraft as defined in claim 26, wherein said improvement further comprises said fuel hose depending from the lowermost surface of the fuselage, between the wings.

29. The improved aircraft as defined in claim 26, wherein said improvement further comprises said fuel hose being retractable to eliminate snagging when not in use.

30. The improved aircraft as defined in claim 1, wherein said improvement further comprises, two pair of second fire extinguishers being disposed in the fuselage for extinguishing any fires on the another aircraft.

31. The improved aircraft as defined in claim 30, wherein said improvement further comprises said two pair of second fire extinguishers being disposed in the fuselage, and extending upwardly from the nose of the fuselage.

* * * * *